United States Patent Office 3,681,295
Patented Aug. 1, 1972

3,681,295
POLYMERIZATION OF 2-PYRROLIDONE USING N-ACYL COMPOUNDS AS CO-ACTIVATORS WITH CARBON DIOXIDE AS ACTIVATOR
Peter A. Jarovitzky, Stamford, Conn., assignor to Radiation Research Corporation, Stamford, Conn.
No Drawing. Filed Sept. 3, 1970, Ser. No. 69,498
Int. Cl. C08g 20/16
U.S. Cl. 260—78 P                                9 Claims

ABSTRACT OF THE DISCLOSURE

An improved process for the polymerization of 2-pyrrolidone to provide high molecular weights and high rates of conversion comprising polymerizing 2-pyrrolidone in the presence of an alkaline polymerization catalyst, carbon dioxide, and not more than 7 millimols of an acyl compound per mol of the alkaline polymerization catalyst. The acyl compound can conveniently be any of the acyl compounds previously disclosed as polymerization activators in the polymerization of 2-pyrrolidone.

---

This invention relates to the polymerization of 2-pyrrolidone.

Methods for the polymerization of 2-pyrrolidone to form polypyrrolidone have been previously disclosed, for example, in U.S. Pats. 2,638,463, 2,809,958 and 2,891,038. In general, these methods involve the polymerization of 2-pyrrolidone in the presence of an alkaline polymerization catalyst, and, usually, with an activator as well.

The polymer formed from 2-pyrrolidone is believed to be a linear polyamide, which has come to be known as nylon-4, having the structure:

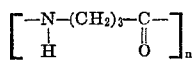

The polymer may be shaped into ribbons, films, molded articles and fibers. Because of its hydrophilic properties, which closely resemble those of cotton and silk, nylon-4 fiber has long been recognized as having great commercial potential. For example, fabrics made from nylon-4, in contrast with other presently available synthetic fibers, are as readily dyed as cotton; they may be ironed at cotton temperatures; they rapidly dissipate static charges; and, in particular, they possess the comfort of cotton and wool.

Nylon-4 fiber has never been made commercially, however, primarily because efforts to manufacture the fiber by the economical melt spinning method have met with almost universal failure. In the copending application of Carl E. Barnes, Ser. No. 763,898, filed Sept. 30, 1968, entitled "Polymers of 2-Pyrrolidone," now abandoned and in the continuation-in-part application thereof Ser. No. 69,471, filed Sept. 3, 1970, there is disclosed and claimed novel polymers of 2-pyrrolidone that can be converted into useful shaped articles, such as fibers, filaments, rods, bristles, films, ribbons and the like, by the inexpensive method of melt extrusion.

The polymers of 2-pyrrolidone of the aforesaid Barnes applications exhibit a marked increase in heat stability as compared to prior art polymers, which is particularly important in the formation of fibers by melt extrusion.

The aforesaid Barnes applications disclose that the new nylon-4 polymers can be prepared by polymerizing 2-pyrrolidone using an alkaline polymerization catalyst in the presence of $CO_2$. For example, polymerization can be effected by bubbling $CO_2$ through a mixture of 2-pyrrolidone and an alkali metal salt of 2-pyrrolidone, e.g. sodium or potassium pyrrolidonate, the alkali metal pyrrolidonate functioning as an alkaline polymerization catalyst, and then polymerizing the carbonated mixture.

The new polymer of the Barnes applications can also be prepared by reacting $CO_2$ with the alkali metal salt of 2-pyrrolidone to form an adduct of $CO_2$ and the alkali metal pyrrolidonate, and then polymerizing the 2-pyrrolidone monomer in the presence of the adduct.

The specific details of the formation of the new nylon-4 using $CO_2$ can be found in the aforementioned Barnes applications, and therefore the polymerization procedure will only be briefly discussed herein. The reaction conditions for the polymerization of 2-pyrrolidone in the presence of $CO_2$ are essentially the same as that already described in the prior art. In general, 2-pyrrolidone monomer may be polymerized at a temperature from about 18° C. to about 100° C., preferably 25° C. to 70° C., and most preferably 25° C. to 60° C., under a pressure ranging from subatmospheric to superatmospheric in the presence of the alkaline polymerization catalyst. Bulk polymerization or suspension polymerization can be used. A technique using an anhydrous nonsolvent, such as hydrocarbon, is suitable, as described in U.S. Patent 2,739,959.

The catalyst may be any alkaline catalyst for polymerizing 2-pyrrolidone, such as those disclosed in previously mentioned U.S. Pats. 2,638,463, except that the alkali metals or any other agent that may reduce the sensitive 2-pyrrolidone ring thereby introducing impurities which may be harmful to the polymerization reaction are not used. Suitable catalysts are derivatives of the alkali metals, e.g. the hydrides, hydroxides and oxides of the alkali metals. The alcoholates of the alkali metals, such as sodium methylate, or a quaternary ammonium base as described in U.S. Pat. 2,973,343 of the formula:

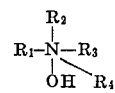

wherein $R_1$, $R_2$ and $R_3$ are lower alkyl radicals and $R_4$ is an alkyl, aryl or aralkyl radical, may be used with good results. The aforesaid Barnes applications provide a complete description of the large number of alkaline polymerization catalysts that can be used.

The catalyst may be used in an amount of 0.5 to 50% by weight, based on the 2-pyrrolidone monomer, preferably 5 to 30 wt. percent, most preferably 8 to 20 wt. percent.

The preferred proportion of $CO_2$ and polymerization catalyst is about 2 mols of the catalyst per mol of $CO_2$. The temperature at which the $CO_2$ is added to the catalyst may be varied widely, good results having been obtained at temperatures ranging from 18° C. (approximately the freezing point of the solution of the catalyst in monomer) to 130° C. or higher.

Suitably, the 2-pyrrolidone monomer will be contacted with 0.01 to 10 wt. percent of $CO_2$, based on the weight of the 2-pyrrolidone monomer. Presently preferred amounts are 0.2 to 6 wt. percent, based on the weight of the 2-pyrrolidone, while 0.5 to 5 wt. percent are the most preferred amounts.

The amount of carbon dioxide can also be expressed as a mol percent of the mols of alkaline polymerization catalyst. The amount of carbon dioxide would thus be from about 0.06 to 60 mol percent, based on the mols of the alkaline polymerization catalyst, but higher amounts, e.g. up to about 80 mol percent $CO_2$ based on the mols of alkaline polymerization catalyst have been used. Generally, the amount of $CO_2$ on a molar basis will be from 10 to 80 mol percent, based on the mols of alkaline polymerization catalyst.

It is possible to introduce $CO_2$ into the system other than by bubbling $CO_2$ into the mixture of 2-pyrrolidone and alkaline polymerization catalyst. For example, the source of $CO_2$ can be a compound that will transfer $CO_2$ to the mixture of 2-pyrrolidone monomer and alkaline polymerization catalyst, provided that the anion remaining after loss of $CO_2$ from the compound is not deleterious to the polymerization. Adducts of carbon dioxide and an alkali metal or quaternary ammonium pyrrolidonate can be added to a mixture of 2-pyrrolidone monomer and alkaline polymerization catalyst, as can adducts of $CO_2$ and an alkali metal or quaternary ammonium caprolactamate, with or without any $CO_2$ gas added to the system. These adducts are added to the system on the same weight basis as the $CO_2$.

A convenient method for preparing the adducts is to bubble $CO_2$ through an anhydrous mixture of the pyrrolidonate and 2-pyrrolidone under vacuum until there is a sharp rise in pressure indicating that the $CO_2$ is no longer being readily absorbed. The adduct is precipitated by adding benzene or other organic precipitant to the solution. There is recovered from the precipitate a free-flowing, nonhygroscopic, white powder. Alternatively, the organic precipitant can be added to an anhydrous solution of pyrrolidonate in 2-pyrrolidone before the $CO_2$ is bubbled through the solution, in which case the precipitate forms as the $CO_2$ is absorbed.

Since it is necessary to react $CO_2$ with anhydrous pyrrolidonate, it is preferred to form the $CO_2$-pyrrolidonate adduct by adding $CO_2$ to an anhydrous solution of pyrrolidonate in 2-pyrrolidone, where the pyrrolidonate is formed in situ as described above.

In a similar manner, the adduct of $CO_2$ and caprolactamate is formed by bubbling $CO_2$ through an anhydrous solution of caprolactamate in caprolactam and adding the organic precipitant before or after the $CO_2$ addition. Generally, when the caprolactamate is formed in situ, temperatures in excess of 90° C. are avoided.

The aforesaid Barnes applications disclose that the carbon dioxide can be used with another polymerization activator, such as the acyl compounds discussed in previously mentioned U.S. Pat. 2,809,958, or any of the activators mentioned in U.S. Pats. 2,912,415; 3,016,366; 3,022,274; 3,028,369; 3,033,831; 3,040,004; 3,042,659; 3,060,153; 3,061,593; 3,069,392; 3,135,719; 3,148,174; 3,158,589; 3,174,951; 3,180,855; and 3,210,324. In such cases, according to the technique described in the Barnes applications, a bimodal molecular weight distribution is obtained. That is, the curve representing frequency versus molecular weight has two peaks, the carbon dioxide causing a peak in the high molecular weight area and the other activator causing a peak in the lower molecular weight area. Furthermore, the use of a second activator with carbon dioxide tended to lower the molecular weight of the polymer, presumably due to the formation of low molecular weight polymer by the second activator.

The bimodal molecular weight distribution is an indication that the polymerization has taken place through two separate mechanisms, one due to $CO_2$ and the other due to the second activator. We have now found that if the polymerization of 2-pyrrolidone is carried out in the presence of an alkaline polymerization catalyst, $CO_2$, an acyl compound, and, preferably, a particulate material, a unimodal molecular weight distribution can be obtained if the amount of the acyl compound is not more than 7 millimols per mol of the alkaline polymerization catalyst. This is indicative that the $CO_2$ and the acyl compound, under these conditions, are acting together by a single polymerization mechanism. Furthermore, the use of $CO_2$ and the acyl compound, under these conditions, increases the polymerization rate and/or polymer molecular weight as compared to a polymerization using $CO_2$ alone.

This is indeed a surprising and unexpected effect, since polymerization activators other than $CO_2$, by themselves, result in low molecular weight polymer, and it would not be expected that any special conditions could be found to avoid the bimodal distribution referred to in the Barnes applications above. Through, the present invention, faster rates of polymerization can be achieved using $CO_2$ while preserving the high molecular weight of the polymer.

When the amount of the acyl compound exceeds 7 millimols per mol of the alkaline polymerization catalyst, the polymerization becomes bimodal and the molecular weight of the polymer tends to fall. A preferred range is 0.6 to 7 millimols of acyl compound per mol of alkaline polymerization catalyst, although smaller amounts can be used.

Any of the acyl compounds referred to in U.S. Pat. 2,809,958 can be used, and the disclosure thereof is hereby incorporated by reference herein. The preferred acyl compounds are N-acyl pyrrolidones, such as N-acetyl pyrrolidone and N-adipyldipyrrolidone. The identity of the acyl compound is not critical, since the prior art is aware of a large number of acyl compounds as activators, all of which tend to function in a similar manner. For convenience sake, it is preferred to use acyl compounds with from 1 to 8 carbon atoms in the acyl group.

A preferred alkaline polymerization catalyst is the alkali metal salt of 2-pyrrolidone which can be formed by reacting under vacuum an excess of 2-pyrrolidone and an alkali metal hydroxide to form a mixture of 2-pyrrolidone and the salt thereof, and removing the water thus formed. To this mixture the $CO_2$ is then added. A preferred procedure is to add the $CO_2$ in an amount less than can be fully absorbed, say from 10 to 90% of total absorption, preferably from 25 to 80%, and then to add the acyl compound.

The particulate material may be a mixture of alkali metal carbonate and bicarbonate, active carbon or any other particulate material as described in the copending application of Peter A. Jarovitzky, Ser. No. 69,496, filed Sept. 3, 1970, entitled "Polymerization of 2-Pyrrolidone." In the present invention it is preferred to use a mixture of alkali metal bicarbonate and alkali metal carbonate wherein the weight ratio of bicarbonate to carbonate is desirably from about 1.6:1 to about 6:1, preferably about 3:1, and the total weight of the mixture of bicarbonate and carbonate is desirably from about 1.2% to about 3.5% by weight, based on the weight of the 2-pyrrolidone, preferably about 1.5% to about 2.6%. A particularly preferred recipe is:

| | Parts by wt. |
|---|---|
| 2-pyrrolidone | 264 |
| KOH (85% assay) [a] | 20.4 |
| $KHCO_3$ [b] | 4.3 |
| $K_2CO_3$ [b] | 1.2 |

[a] KOH pellets assay 85% KOH, 2% $K_2CO_3$ and 13% $H_2O$.
[b] Reagent grade $KHCO_3$ and $K_2CO_3$.

The polymerization is preferably effected by heating the 2-pyrrolidone, KOH, $KHCO_3$ and $K_2CO_3$ and particulate under vacuum to about 115° C. or below for 30 minutes while removing water but without distilling off any of the monomer. The reaction mass is cooled to room temperature while maintaining the vacuum and dry $CO_2$ gas is bubbled through the mass to provide from 10 to 90% of the maximum $CO_2$ that the reaction mass can absorb and then the acyl compound is added. The polymerizate is then transferred to a polymerization oven, e.g. at 50° C.

It is desirable to carry out the polymerization in the substantial absence of water, although anhydrous conditions are not essential; e.g. the amount of water should not exceed about 0.1% by weight of the 2-pyrrolidone monomer.

The present invention is illustrated by the following examples. In these examples, intrinsic viscosity is at 30° C. in formic acid, and is reported as deciliters per gram.

EXAMPLE 1

To illustrate the effect of the acyl activator, three experiments were conducted, one with $CO_2$ alone and two with $CO_2$ and N-acetyl pyrrolidone.

In Run 1 264 grams of 2-pyrrolidone, 20.4 grams of 85% assay KOH pellets, 4.3 grams reagent grade $KHCO_3$ and 1.2 grams reagent grade $K_2CO_3$ were charged to a 500 ml. round bottom flask equipped for vacuum distillation. The contents of the flask were heated under nitrogen to a temperature of about 115° C. at a vacuum of about 3–5 mm. Hg for 30 minutes so as to remove the water formed without distilling monomer. The reaction mass was cooled to room temperature and dry $CO_2$ gas was admitted to the flask while the vacuum was maintained. The $CO_2$ addition was stopped when the pressure in the flask reached atmospheric, and the contents of the flask were polymerized at 50° C. The time for full absorption of the $CO_2$ was measured. This time was designated as the "saturation time."

Runs 2 and 3 employed the same procedure except that the $CO_2$ flow was cut off before the full "saturation time" was reached and then an amount of N-acetyl pyrrolidone was added. The results of Runs 1–3 are reported in Table I.

TABLE I

| Run | Catalyst | Oven time (hrs.) | Conversion (percent) | Intrinsic viscosity |
|---|---|---|---|---|
| 1 | 100% $CO_2$ only | 5 | 0.7 | |
| | | 17 | 6.1 | 6.0 |
| | | 24 | 8.5 | 6.2 |
| | | 45 | 20.5 | 7.7 |
| | | 69 | 33.7 | 8.4 |
| 2 | 0.26 g. N-acetylpyr. added after ½ time for $CO_2$ | 2 | 39.2 | 2.4 |
| | | 18 | 61.5 | 3.7 |
| | | 24 | 60.0 | 3.3 |
| | | 42 | 61.4 | 3.1 |
| | | 66 | 61.5 | 3.1 |
| 3 | 0.026 g. N-acetylpyr. added after ¼ time for $CO_2$. | 16.5 | 46.3 | 11.0 |
| | | 24 | 52.4 | 8.6 |
| | | 40.5 | 59.6 | 8.25 |
| | | 64.5 | 61.2 | 8.4 |

EXAMPLE 3

The procedure of Example 1 was duplicated except that the N-acetyl pyrrolidone was added after 50 or 80% of the $CO_2$ "saturation time." The results are in Table III below.

TABLE III

| Run | Activator | Oven time (hrs.) | Conversion (percent) | Intrinsic viscosity |
|---|---|---|---|---|
| 1 | 100% $CO_2$ | 5 | 1.5 | <1.7 |
| | | 23 | 6.9 | 6.6 |
| | | 30 | 23.2 | 7.2 |
| | | 45 | 37.4 | 6.3 |
| | | 61 | 42.5 | 6.6 |
| 2 | 0.026 g. N-acetyl pyrrolidone after 80% of $CO_2$ saturation time. | 5 | 16.1 | 5.3 |
| | | 10 | 26.2 | 6.3 |
| | | 22 | 28.0 | 8.3 |
| | | 40 | 48.2 | 8.4 |
| | | 60 | 49.8 | 8.0 |
| 3 | 0.026 g. N-acetyl pyrrolidone after 50% of $CO_2$ saturation time. | 5 | 12.0 | 5.8 |
| | | 10 | 35.4 | 7.7 |
| | | 17 | 35.2 | 8.4 |
| | | 26 | 52.0 | 9.8 |
| | | 44 | 62.5 | 8.3 |
| 4 | 0.26 g. N-acetyl pyrrolidone after 80% of $CO_2$ saturation time. | 1 | 11.6 | 4.7 |
| | | 5 | 19.8 | 6.2 |
| | | 10 | 27.8 | 7.5 |
| | | 16 | 38.4 | 7.8 |
| | | 44 | 59.5 | 7.8 |
| 5 | 0.26 g. N-acetyl pyrrolidone after 50% of $CO_2$ saturation time. | 2.5 | 12.0 | 1.7 |
| | | 5 | 30.5 | 1.7 |
| | | 10 | 57.0 | 6.3 |
| | | 24 | 66.0 | 5.7 |
| | | 44 | 62.5 | 4.7 |

EXAMPLE 4

The procedure of Example 1 was duplicated except that no $CO_2$ was added at all, and the amount of the KOH pellets was varied. This example is for comparative purposes only and does not illustrate the invention. The results are reported in Table IV below.

TABLE IV

| Run | N-acetyl-pyrrolidone (grams) | KOH (grams) | $KHCO_3$ (grams) | $K_2CO_3$ (grams) | Max., percent cov. | At longest time, hrs. | Intrinsic viscosity |
|---|---|---|---|---|---|---|---|
| 1 | 0.26 | 7.9 | | | 44.6 | 42.5 | <1.7 |
| 2 | 0.026 | 7.9 | | | 28.0 | 64 | <1.7 |
| 3 | 0.26 | 7.9 | | | 29.5 | 4 | <1.7 |
| 4 | 0.26 | 20.4 | | | 20.1 | 70.5 | <1.7 |
| 5 | 0.26 | 7.9 | 4.3 | 1.2 | 44.3 | 69 | <1.7 |
| 6 | 2.64 | 7.9 | | | 77.6 | 24 | <1.7 |

EXAMPLE 2

The procedure of Example 1 was duplicated except that 0.026 gram of N-acetyl pyrrolidone were added after one-half the $CO_2$ "saturation time." The results are reported in Table II below. The molecular weight distribution of the polymer formed in Run 2 was obtained and was unimodal, having only one peak.

TABLE II

| Run | Catalyst | Oven time (hrs.) | Conversion (percent) | Intrinsic viscosity |
|---|---|---|---|---|
| 1 | 100% $CO_2$ only | 5 | 0.2 | |
| | | 17 | 3.4 | 5.2 |
| | | 24 | 5.6 | 5.2 |
| | | 45.5 | 14.0 | 6.2 |
| | | 69.5 | 23.9 | 6.8 |
| 2 | 0.26 g. N-acetylpyr. added after ½ time for $CO_2$. | 4 | 17.8 | 7.9 |
| | | 17 | 45.5 | 10.5 |
| | | 24 | 51.4 | 9.7 |
| | | 43.5 | 61.6 | 8.3 |
| | | 67.5 | 63.0 | 7.75 |

Examples 1–4 show the advantages obtained by the present invention. Whereas the acyl compound, N-acetyl pyrrolidone, with or without the particulate material, gave low molecular weight polymer in the absence of $CO_2$ (Example 4), when used with $CO_2$ in an amount within the specified range it gave higher conversions of the high molecular weight polymer than the use of $CO_2$ alone.

While Run 2 of Example 1 shows a reduction in molecular weight at 6.7 millimols of N-acetyl pyrrolidone per mol of potassium pyrrolidonate, as compared to Run 1 without any N-acetyl pyrrolidone, other runs have indicated that polymerizations can be effected with loss of molecular weight at this level, such as in Example 3. This shows that more than 7 millimols of the acyl compound per mol of alkaline polymerization catalyst should not be used.

EXAMPLE 5

This example illustrates the method of the present invention when carried out in the absence of a particulate material.

The procedure of Example 1 was duplicated except that the KHCO$_3$ and K$_2$CO$_3$ were omitted. In Run 1 no N-acyl activator was used whereas Runs 2 and 3 employed two different levels of N-acetyl pyrrolidone at two different CO$_2$ addition to show the applicability of the method over a range of conditions. The results are reported in Table V below.

TABLE V

| Run | Activator | Oven time (hrs.) | Conversion (percent) | Intrinsic viscosity |
|---|---|---|---|---|
| 1 | 100% CO$_2$ | 5 | 3.4 | 3.1 |
|   |   | 15.5 | 5.0 | 3.3 |
|   |   | 24 | 10.5 | 4.3 |
|   |   | 40 | 17.6 | 5.8 |
|   |   | 64 | 32.2 | 6.8 |
| 2 | 0.026 g. N-acetyl pyrrolidone after 50% of CO$_2$ saturation time. | 2.5 | 13.9 | 7.9 |
|   |   | 5 | 15.0 | 7.8 |
|   |   | 10 | 23.4 | 8.4 |
|   |   | 38 | 58.0 | 7.7 |
|   |   | 62 | 61.6 | 7.2 |
| 3 | 0.26 g. N-acetyl pryrrolidone after 80% of CO$_2$ saturation time. | 2.5 | 10.3 | 1.7 |
|   |   | 5 | 13.4 | 4.0 |
|   |   | 10 | 28.2 | 6.8 |
|   |   | 23 | 40.4 | 7.2 |
|   |   | 31 | 59.8 | 8.2 |

What is claimed is:

1. A process for the polymerization of 2-pyrrolidone to form a solid polymer, which comprises polymerizing said 2-pyrrolidone in the presence of an alkaline polymerization catalyst, carbon dioxide as a polymerization activator, and an acyl compound as a co-activator, said acyl compound being present in an amount of not more than 7 millimols per mol of said alkaline polymerization catalyst.

2. The process according to claim 1, wherein the amount of said acyl compound is from about 0.6 to about 7 millimols per mol of said alkaline polymerization catalyst.

3. The process according to claim 1, wherein said acyl compound is an N-acyl pyrrolidone.

4. The process of claim 3, wherein the acyl group contains from 1–8 carbon atoms.

5. The process according to claim 1, wherein 2-pyrrolidone is heated with an amount of an alkali metal hydroxide less than the stoichiometric amount necessary to convert all of the 2-pyrrolidone to the alkali metal pyrrolidonate, carbon dioxide is added to the resulting mixture in an amount less than can be fully absorbed by said mixture, and said acyl compound is then added to the resulting carbonated mixture before said carbonated mixture is polymerized.

6. The process according to claim 5, wherein the amount of carbon dioxide is from 10 to 90% of the amount that can be fully absorbed by said mixture.

7. The process of claim 6, wherein said acyl compound is N-acetyl pyrrolidone.

8. The process according to claim 7, wherein the alkali metal hydroxide and said 2-pyrrolidone are admixed with an alkali metal bicarbonate and an alkali metal carbonate before said 2-pyrrolidone and said alkali metal hydroxide are heated, the total amount of the alkali metal bicarbonate and alkali metal carbonate being from 1.2% to 3.5% by weight, based on the weight of the 2-pyrrolidone, and the weight ratio of bicarbonate to carbonate being from about 1.6:1 to about 6:1.

9. The process according to claim 8, wherein said alkali metal hydroxide is potassium hydroxide, said alkali metal bicarbonate is potassium bicarbonate and said alkali metal carbonate is potassium carbonate.

References Cited
UNITED STATES PATENTS

| | | | |
|---|---|---|---|
| 3,042,659 | 7/1962 | Follett | 260—78 P |
| 3,060,153 | 10/1962 | Follett | 260—78 P |
| 3,216,976 | 11/1965 | Schwartz et al. | 260—37 N |
| 3,322,715 | 5/1967 | Kumnick | 260—37 N |

HAROLD D. ANDERSON, Primary Examiner

U.S. Cl. X.R.
260—31.2 N, 37 N